March 1, 1955

M. L. SMALLEGAN 2,703,099

POULTRY WATERER CONTROL

Filed May 25, 1953

INVENTOR.
MARVIN L. SMALLEGAN
BY
Peter P. Price
ATTORNEY

United States Patent Office 2,703,099
Patented Mar. 1, 1955

2,703,099

POULTRY WATERER CONTROL

Marvin L. Smallegan, Zeeland, Mich., assignor to Automatic Poultry Feeder Company, Zeeland, Mich., a corporation of Michigan Application May 25, 1953, Serial No. 357,017

1 Claim. (Cl. 137—428)

This invention relates to devices for supplying water to poultry watering troughs and more particularly to a separate unit designed to be utilized with various lengths and types of watering troughs to automatically supply the water to the trough and maintain it at a predetermined level.

My invention provides as a simple, sturdy and dependable structure, a control tank for admitting water to a watering system consisting of one or two troughs extending a substantial distance from the tank. The tank is located adjacent the water source. Thus, it makes the watering system readily adaptable to the available water facilities rather than requiring these facilities to be modified to fit the system. This, in itself, frequently results in substantial savings in installation expense.

My invention provides an accurate water level control. While it at all times insures an adequate supply of water for the poultry, it is so constructed that it is impossible for it to overflow and flood the floor of the poultry house.

Another purpose of my invention is to provide a waterer of large capacity whereby a single unit will be adequate for a large flock of birds. The only adjustment necessary to modify my waterer from the needs of a small flock to that of a large flock is the addition of further lengths of trough. This results in substantial savings in capital outlay. At the same time, my waterer is quickly and easily adjustable in height to accommodate both the smallest of chicks and the largest of poultry such as grown turkeys. One man may quickly adjust an entire system in a very short time.

The entire watering system is of simple construction making it easy and quick to both assemble and disassemble. It also makes the system easy to clean, thus substantially reducing operating cost.

These and other advantages of my invention will be readily seen by those acquainted with the design and construction of poultry equipment upon reading the following specification and the accompanying drawings.

Figure 1:
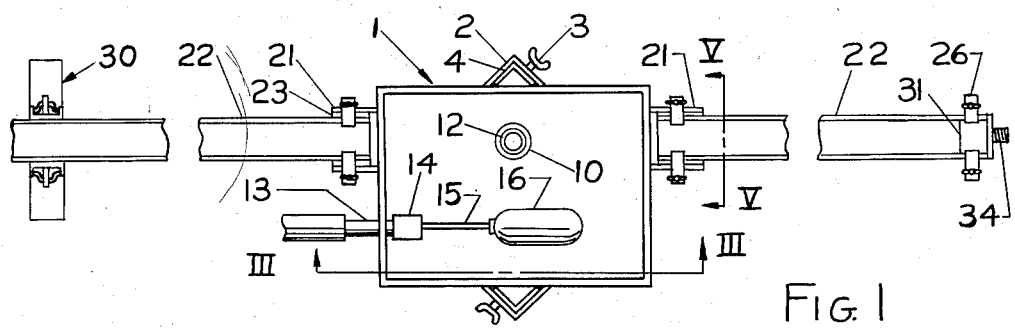
Fig. 1 is a fragmentary plan view of my improved water control device and the troughs attached thereto.
Figure 2:
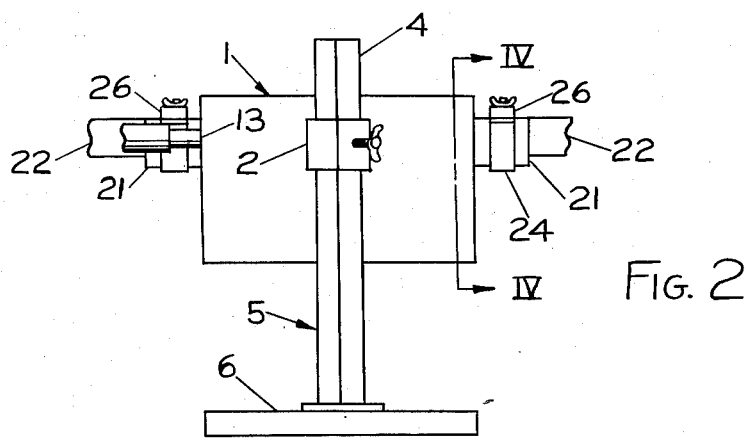
Fig. 2 is a fragmentary side elevation view of the water control device.
Figure 3:
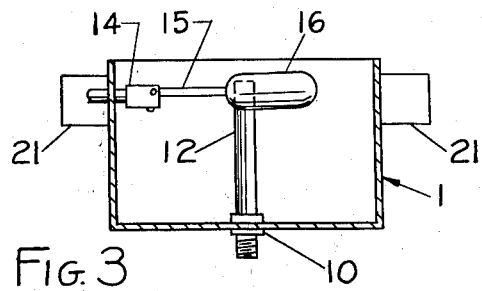
Fig. 3 is a sectional elevation view taken along the plane III—III of Fig. 1.
Figure 4:
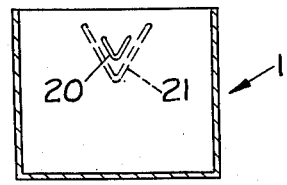
Fig. 4 is a sectional elevation view taken along the plane IV—IV of Fig. 2.
Figure 5:
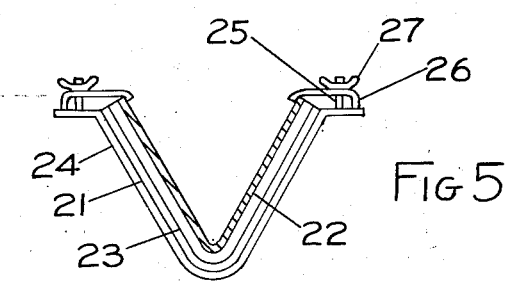
Fig. 5 is an enlarged sectional elevation view of a typical trough joint taken along the plane V—V of Fig. 1.

In executing the objects and purposes of my invention I have provided a tank having a water inlet controlled by a float valve. An overflow pipe is removably attached to the bottom of the tank. It extends upwardly within the tank and discharges through the bottom thereof. The tank on each side is provided with V-shaped openings through which water discharged into the tank may flow out into troughs extending from each side of the tank. The trough for the water is detachably secured to the tank adjacent each of the water discharge openings. Within the limits of the tank's capacity it will properly supply water to the system and as many lengths of trough as may be added to the system as is necessary. The tank may be placed between the ends of any two sections of the trough or it may be placed at one end of the system, depending upon the location of the water source.

Referring to the drawings in detail. The numeral 1 indicates a tank which may be of any suitable shape but preferably is square or rectangular. The tank 1 has a pair of brackets 2, one on each side, each of which are equipped with a pair of wing nut headed set screws 3. Each of the brackets 2 defines a triangular shaped aperture through which slidably extends the vertical leg 4 of a standard 5. The vertical legs 4 are of angle iron with their apices extending away from the tank to closely seat within the apertures of the brackets 2. At its lower end, each vertical leg 4 is secured to a base 6.

A centrally apertured, internally threaded nipple 10 is mounted in the bottom of the tank 1. Below the bottom of the tank, the nipple is adapted to engage a coupling on the end of a standard hose or pipe 11. A length of pipe 12 threaded on one end engages the nipple 10. The height of the pipe 12 is such that it provides an overflow, should the inlet valve fail and excess water enter the tank.

Water is admitted to the tank through the pipe 13. The pipe 13 is coupled to any suitable source of water under pressure. The pipe 13 extends through the tank and on its inward end is provided with a valve assembly 14 operated by means of a lever 15. On the free end of the lever 15 is a float 16. The valve assembly 14 is so constructed that when the float is raised to a predetermined level, the valve is closed. The internal structure of the valve may be of any suitable, conventional construction. It forms no part of this invention. It is for these reasons not described in detail.

At each end, the tank 1 is provided with a V-shaped opening 20. The V-shaped opening or slot 20 is narrow and is located at or just below the normal level in the tank. Projecting out from each end of the tank and surrounding each of the openings 20 is a V-shaped bracket 21. The brackets 21 are rigidly secured to the tank 1 and extend both above and below the opening 20. The V-shaped brackets 21 serve as a means to mount and support the ends of the water trough 22 used with the tank 1.

The trough 22 is V-shaped. Where the trough 22 enters the bracket 21 a gasket 23 of rubber or other suitable, resilient material is placed between the trough and the bracket. A V-shaped strap 24 seats under the bracket 21 and at its upper end mounts a pair of studs 25. Seated over each of the studs 25 is a clip 26 which, when pulled down by means of a wing nut 27 on the studs, presses the trough tightly against the gasket 23 forming a sealed joint. This is the same type of trough joint structure as appears in Patent 2,626,724. As many lengths of trough may be used as are desired with each length of trough being joined to adjacent trough lengths by means of a gasket and clamp assembly such as has just been described. At suitable places along its length and adjacent its end the trough is supported by vertically adjustable leg assemblies 30. These leg assemblies may be of any suitable type.

The end of the trough is closed by means of an end piece 31. The end piece 31 is secured to the trough in the same manner as the sections of trough are secured together, utilizing a strap, clips and a sealing gasket.

The various parts of my invention with the exception of the valve 14 and its related components are preferably fabricated from steel and coated with a suitable corrosion resistant material. Preferably they are coated with enamel to make the surfaces not only resistant to oxidation but resistant to the particular acids encountered in poultry husbandry. Enamelling also makes them smooth and easy to clean. The valve assembly 14 and, if desired, the overflow pipe 12 together with its related fittings are fabricated from brass. The float 16 may be of any suitable material such as a hollow copper ball or a plastic having a specific gravity substantially less than that of water.

*Operation*

The tank 1 and its related parts are designed as a complete and separate assembly to which as much trough may be added as desired. Further, this trough may be added in any desired arrangement. The tank 1 is located at a position where it is convenient to a supply of water. This may be at the middle of the proposed watering system or at either end or at some intermediate point. If the tank 1 is located at one end of the watering system, the trough 22 will extend from only one side of the tank. In this case, one of the trough terminals 31 is used to seal off the trough opening provided at one of the brackets 21.

After the tank 1 has been located, it is vertically adjusted to the desired height which may be from substantially on the floor to a foot or more above it. Enough trough lengths 22 to provide a system of the desired length are then attached to the tank 1 and the whole leveled so that the water depth throughout the entire trough length will be substantially the same. The water inlet 13 is connected to the water source and the overflow pipe 12 is put in place. Preferably the coupling at the bottom of the overflow is connected to a discharge conduit 11 so that any water discharged through this opening will be removed from the poultry house. The height of the overflow pipe 12 is such that it will be above the normal level of the water in the tank and the troughs when they are at operating level. It is, however, slightly below the top of the troughs whereby it will discharge excess water before the water overflows the top of the trough should the control valve fail.

The float 16 and valve assembly 14 act to regulate the level of the water in the system. The float will automatically shut off the water when the desired operating level has been reached and open the valve to supply water when the supply is partially depleted. The float may be made adjustable so that the depth of the water flowing into the troughs will be maintained at the desired level.

Drainage of the troughs and the tank is quickly accomplished by removal of the overflow pipe 12. The V-shaped openings 20 are adequate to supply the troughs with water but are small enough to prevent litter and other solid debris in the troughs from entering the tank when the water is drained by removal of the pipe 12. The litter is caught at the exterior of the openings 20 and cannot enter the box where it could clog the drain or cause difficulty with the valve assembly 14. The ease with which the system may be drained substantially reduces the time necessary to thoroughly clean the system. Because of its simplicity, the system once drained may be easily cleaned either by wiping or brushing. When the parts are enamelled, none of the dirt which frequently enters poultry watering systems will adhere to the trough. This greatly reduces cleaning time.

If it is desired to maintain a constant change of water in the troughs, the end 31 may be provided with an overflow discharge nipple 34. The nipple 34 may be used at the end of one of the troughs or at the end of both of the troughs. Where the nipple 34 is used, the water enters through the tank 1 and constantly is flowing out into the troughs and overflows through the nipples 34 at the ends. This assures a constant replacement of the water in all portions of the trough.

It will be recognized that the use of a tank having a pair of discharge openings located at opposite ends of the tank is merely a preferred form of my invention. The tank may be designed to service the troughs out of either side or to service troughs extending from both the ends and the sides or any combination of such arrangements. These and other modifications of my invention may be made without departing from the principles thereof. Each of these modifications is to be considered as included in the hereinafter appended claim unless this claim by its language expressly states otherwise.

I claim:

In tank means having side walls, said tank adapted to supply a poultry watering system having at least one trough extending away from said tank, said tank means comprising: a water inlet adapted to discharge into said tank; a float operated valve mounted on said water inlet for regulating the discharge from said water inlet; an orifice through one side wall of said tank and communicating with the interior of said trough, said orifice being a narrow V-shaped slit of such width that litter may not enter said tank from said trough.

References Cited in the file of this patent
UNITED STATES PATENTS

| | | |
|---|---|---|
| 1,811,375 | Wysong | June 23, 1931 |
| 2,292,020 | Venolia | Aug. 4, 1942 |
| 2,502,720 | Haley | Apr. 4, 1950 |
| 2,626,724 | Smallegan | Jan. 27, 1953 |